Mitchel & Chapman,
Snap Hook,
N°67,789. Patented Aug. 13, 1867.
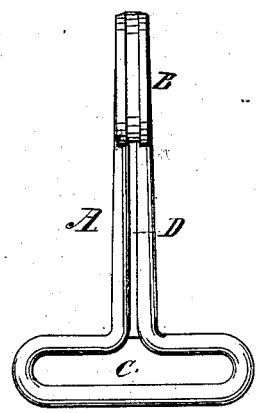
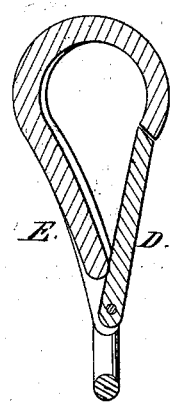
Witnesses:
Theo Tusche
Fred B Miles
Inventors:
M. F. Mitchell
H. B. Chapman
Per Munn & Co
Attorneys

United States Patent Office.

M. F. MITCHEL AND W. B. CHAPMAN, OF WAUKAU, WISCONSIN.

Letters Patent No. 67,789, dated August 13, 1867.

IMPROVED SNAP-HOOK.

*The Schedule referred to in these Letters Patent and making part of the same.*

TO ALL WHOM IT MAY CONCERN:

Be it known that we, M. F. MITCHEL and W. B. CHAPMAN, of Waukau, in the county of Winnebago, and State of Wisconsin, have invented a new and improved Snap-Hook, and that the following description, taken in connection with the accompanying drawings, hereinafter referred to, forms a full and exact specification of the same, wherein we have set forth the nature and principles of our said improvements, by which our invention may be distinguished from all others of a similar class, together with such parts as we claim and desire to have secured to us by Letters Patent.

The snap-hook embraced by the present invention is so constructed as to be most durable and substantial, and most convenient and serviceable. In the accompanying plate of drawings, our improved snap-hook is illustrated—

Figure 1 being a side view of the snap-hook, and

Figure 2 a central section taken in the plane of the line $x \, x$, fig. 1.

A, in the drawings, represents the snap-hook, formed of a hook shape at one end, B, and at the other with an eye or loop, C. D, a jaw, extending across the opening to the hook B, against the extreme end E of which it comes to a seat or rest at one end, while at the other it is pivoted to the main portion of the hook near its loop C. This arm or jaw D rests against a spring, F, fixed in the arm B, and serves to close the hook, forming the snap, as is obvious without any further explanation.

Having thus described our invention, we claim as new, and desire to secure by Letters Patent—

A spring or snap-hook, constructed substantially as described.

M. F. MITCHEL,
W. B. CHAPMAN.

Witnesses:
EDWARD MANNING,
LUTHER M. PARSONS.